Figure 1:
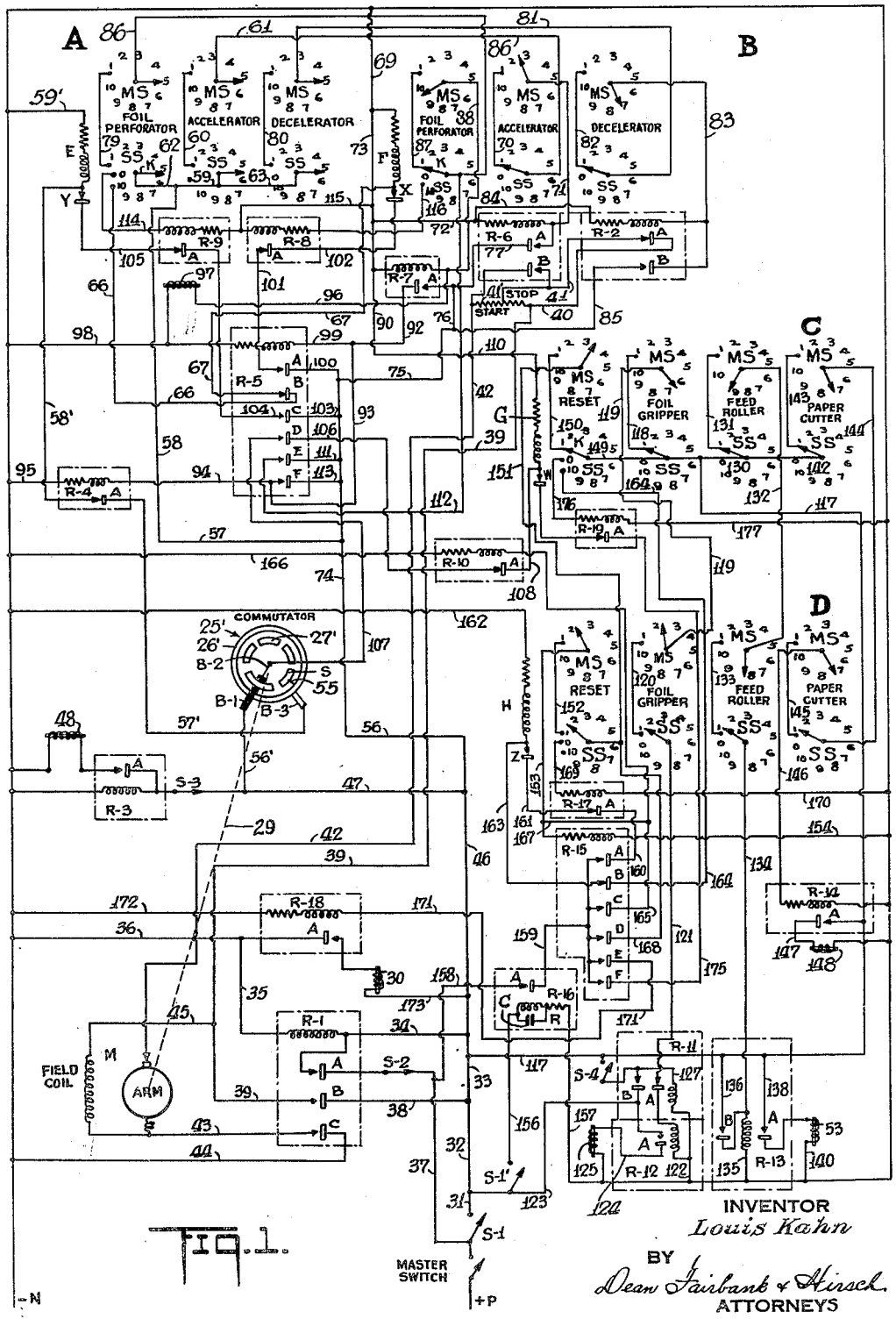

Oct. 7, 1952  L. KAHN  2,613,255
CONTROL SYSTEM
Filed Nov. 10, 1947  2 SHEETS—SHEET 2

INVENTOR
*Louis Kahn*
BY
*Dean Fairbank & Hirsch*
ATTORNEYS

Patented Oct. 7, 1952

2,613,255

UNITED STATES PATENT OFFICE 2,613,255

CONTROL SYSTEM

Louis Kahn, New Bedford, Mass., assignor to Aerovox Corporation, New Bedford, Mass., a corporation of Massachusetts Application November 10, 1947, Serial No. 785,018

6 Claims. (Cl. 175—373)

This invention relates to electrical controls and, while of more general application, is shown as particularly applied to capacitor winding machines.

As conducive to a clear understanding of the invention, it is noted that during the process of winding capacitor sections on a winding machine there is a definite sequence of operations that must be followed. In one specific illustrative example of a winding machine, this sequence includes starting the rotation of the winding mandrel at a relatively low speed so as not to exert a sudden tearing tension on the paper and foil, opening the paper feed rollers which grip the paper when closed, acceleration of the winding mandrel, deceleration of the winding mandrel when the capacitor is almost wound, perforation of the foil, momentary closing of foil grippers which will put a strain on the foil and cause it to tear at the perforations under the tension exerted by the rotating mandrel, closing of the paper feed rollers so that proper tension will be maintained on the paper and foil preparatory to cutting, cutting the paper and initiating a positive stop mechanism which ensures that the winding mandrel will stop in the same position after each section is wound.

The timing of this sequence of operations is based on the number of turns being wound on each capacitor section. It is difficult mechanically to regulate this sequence accurately, especially so if large sections are to be wound, as all machine functions are ordinarily determined by a one revolution cam geared to the main driving shaft. If sections of different sizes are to be wound, the use of mechanical means to regulate this sequence necessitates repeated adjustment, an operation which is both tedious and time-consuming and generally requires disabling of the machine while adjustments are being made.

Where mechanical control means are used for regulating the sequence of operations of a winding machine that is fully automatic, i. e., one which automatically threads the mandrel for each capacitor and where the mandrel must be stopped always in the same angular position after each section is wound, the rotating mass of the machine will be great, and hence to guard against likelihood of breakdown, the machine must be run at relatively low speed, for the greater the rotating mass the more severe the shock of stopping the machine will be to the parts thereof.

It is accordingly among the objects of this invention to provide an electrical control system for a capacitor winding machine that is simple to adjust and when once adjusted will accurately regulate a sequence of mechanical operations, that will enable the size of successive capacitor sections to be varied without disassembling the machine, that is relatively compact and light in weight and that does not add to the rotating mass of the mechanism, and the use of which leads to increase in the life of the winding machine and reduction in the amount of servicing thereto, even when operated at the enhanced speeds permitted as a corrollary of such object.

According to the invention, the winding control system for predetermining the sequence of operation of a capacitor winding machine comprises a commutator on the electric motor which drive the winding mandrel, the commutator being designed automatically to deliver periodic impulses to the electromagnets of a plurality of rotatable stepping switches, said switches being advanced one step at each impulse from the commutator. In the specific embodiment of the invention herein illustrated, there are two sets of stepping switches, one set of which has three sections and the other set four sections. Each of the sections of the stepping switches has a rotatable contact arm with ten contacts associated therewith.

Associated with each of the sections of said stepping switches is a manual selector switch, by means of which the desired sequence of operations is predetermined. Each of the manual switches and the corresponding section of the stepping switches have the same number of contacts. The corresponding contacts of said manual switches and said stepping switches are connected to complete circuits to a plurality of relays from a source of current when the stepping switches have been rotated by the impulses from the commutator to the position set on the manual switch. The relays control a plurality of solenoids which in turn control the various mechanisms necessary for the operation of a capacitor winding machine and also control mechanism in the stepping switches themselves for restoring them to starting or "home" position.

Specifically, the initial set of stepping switches regulates the speed of the electric motor, for full speed during the main period of the winding cycle in which no control operations are performed and for relatively slow movement near the beginning and near the end of each cycle in which various control operations are performed, said stepping switches also controlling the first timed mechanical action in each cycle.

The second or final set of stepping switches is out of circuit until the initial set of stepping switches has performed the first timed mechanical operation. At that time it causes a relay to be operated for setting into circuit the electromagnet that operates the second set of stepping switches, the latter performing the sequence of mechanical operations at the times determined by the setting of the manual selector switches, and upon the performance of the last timed mechanical operation under the control of said second set of stepping switches, a relay is actuated by which the stepping switches are caused to move to home position.

Figure 2:
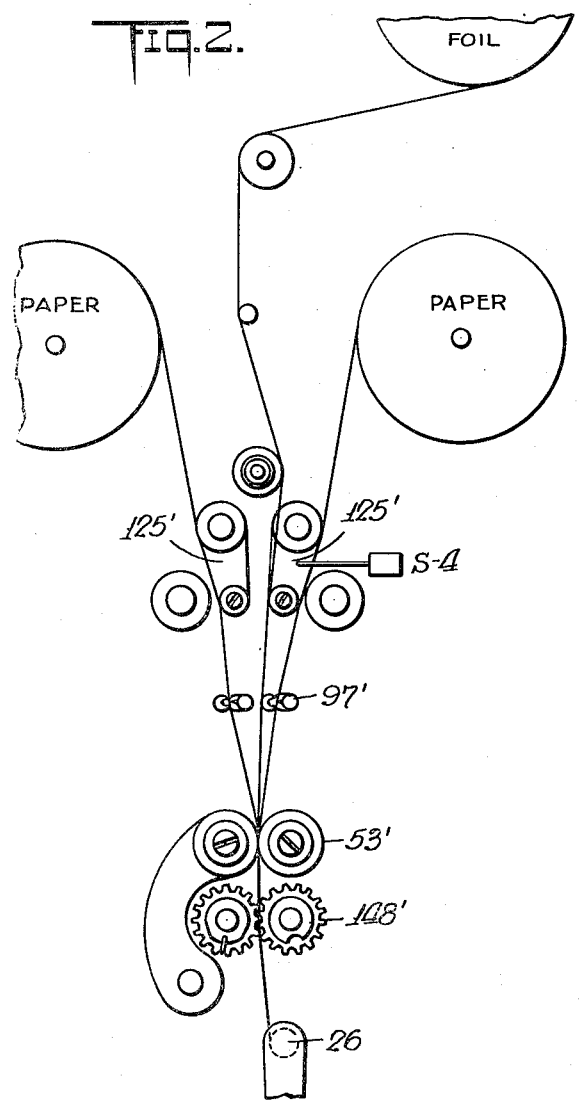
Figure 3:
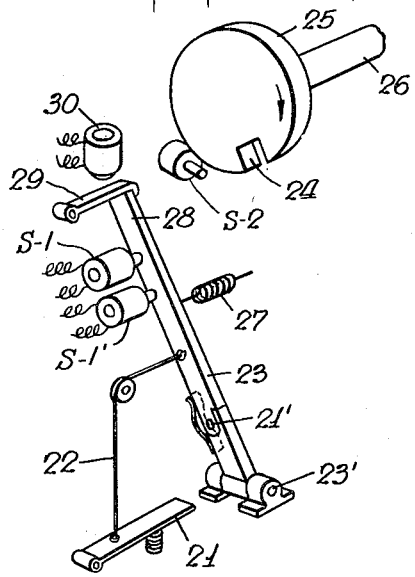
Figure 4:
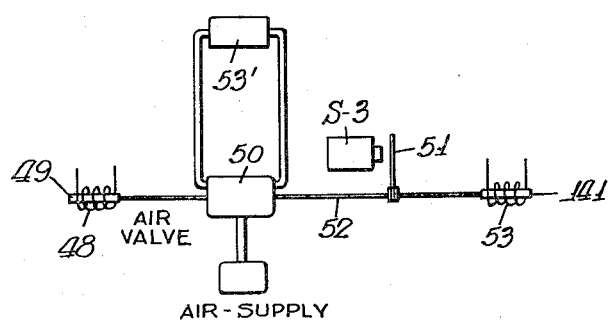

In the accompanying drawings in which are shown one or more of various possible embodiments of the several features of this invention, Fig. 1 is a wiring diagram of the control circuit, Fig. 2 is a diagrammatic view of a capacitor winding machine, Fig. 3 is a diagrammatic view of the mechanical starting mechanism showing the positive stop mechanism, and Fig. 4 is a diagrammatic view of the feed roller actuating mechanism.

In order to comply with the statutory requirements, one specific example of the invention will be explained in detail as applied to a capacitor winding machine of the type diagrammatically shown in Fig. 2. However, it is to be understood that the control system may be utilized for any other winding machine where it is desired to regulate a sequence of operations.

Referring now to the drawings, the manual switches are set to the desired number in accordance with the specifications of the particular capacitor it is desired to manufacture.

After the master switch is closed, treadle 21 is then depressed by the operator to start motor M and thereby begin the sequence of operation in the following manner. Treadle 21 is connected by cable 22 to a lever 23 pivoted at 23', the latter being normally urged by a spring 27 into a slot 24 in hub 25 of winding mandrel 26. Depressing of treadle 21 will pivot lever 23 so that its upper end 28 will be withdrawn from slot 24 and press against normally open switches S-1 and S-1', thereby to close said switches, lever 23 being held in this withdrawn position by a ratchet stop 29. As this latching mechanism is conventional and forms no part of this invention, it will not be more fully described.

Closing of switch S-1 completes a circuit from positive main P through leads 31, 32, 33 and 34, coil of relay R-1, leads 35 and 36 to the negative main N. Relay R-1 will be energized and the normally open contacts A, B and C thereof will close.

A holding circuit for relay R-1 is thereby completed from main P through lead 37, normally closed switch S-2, closed contact A, through the coil of relay R-1, leads 35 and 36 to main N. Thus when switch S-1 is opened (at the time and for the purpose hereinafter described), relay R-1 will remain energized by virtue of this holding circuit and the contacts A, B and C thereof will remain closed until normally closed switch S-2 is opened.

A circuit is also completed from main P through leads 31, 32 and 38, closed contact B of relay R-1, leads 39 and 40, normally closed contact A of relay R-2, lead 41 through the start portion of the armature resistance 41', lead 42, through the armature of motor M to lead 43, through closed contact C of relay R-1 and lead 44 to main N. The field coil of motor M is also energized, the circuit being from main P through leads 31, 32 and 38, closed contact B, leads 39 and 45 through the field coil to lead 43, through closed contact C of relay R-1 and lead 44 to main N.

It is apparent, therefore, that as a result of the energization of relay R-1, a circuit is completed through both the field and armature of the motor, the latter running at reduced speed due to the start portion of the resistance 41' in the armature circuit.

At the same time as the motor starts, the feed rollers 53' (Fig. 2) which are normally open during winding of successive capacitor sections but closed at the end of the winding of each section, will be opened in the following manner due to the energization of solenoid 48:

When switch S-1 is initially closed, a circuit is completed from main P, leads 31, 32, 33, 46 and 47 through normally closed switch S-3 and the coil of relay R-3 to main N. Energization of relay R-3 will close normally open contact A thereof and energize feed roller opening solenoid coil 48.

As diagrammatically shown in Fig. 4, energization of solenoid coil 48 will draw its armature 49 to the left, thereby causing air valve 50 to release air to open the feed rollers 53' by known mechanism not shown herein, inasmuch as it forms no part of this invention. Movement of armature 49 to the left will cause contact 51 carried by rod 52 connected to said armature to contact normally closed switch S-3 opening the latter and breaking the circuit to relay R-3 and solenoid coil 48. However, the air valve has already been moved to the proper position to open the feed rollers and it will remain in this position until feed roller closing solenoid 53 is energized in the manner hereinafter described.

A winding mandrel 26 carrying a commutator 25' is directly driven by the armature of the motor. As shown in the drawing, the commutator is composed of a conducting ring 26' and a segmental ring 27', the latter having five conducting segments thereon insulated from each other. One of the segments S of the segmental ring 27' is connected to the ring 26' by a lead 55. A fixed brush B-1 is placed so that it may contact any one of the segments as the commutator rotates and a fixed brush B-2 is positioned in juxtaposition to brush B-1 so that it can also contact the same segment as does brush B-1. A third fixed brush B-3 contacts the outer conducting ring 26'.

Once every revolution of the commutator, segment S contacts brush B-1. This will complete a circuit from main P through leads 31, 32, 33, 46, 47 and 56', brush B-1, segment S, lead 55, ring 26', brush B-3, lead 57', normally closed contact A of relay R-4, lead 58', coil E of stepping switch A and lead 59' to main N.

It is apparent therefore that an impulse will be delivered to coil E once every revolution of the mandrel.

The stepping switches used herein are of conventional type and are designated SS in the drawings. In the embodiment shown, stepping switches A and B each has three sections and stepping switches C and D each has four sections, each section having ten contact points and a neutral position and a contact arm K moving one step at each impulse. The contact arms of the several sections of each switch A, B, C and D are mechanically ganged so that they move in unison.

The manual switches used herein are designated MS in the drawings and each has the same number of contacts as its respective stepping switch section. The contacts of each of the manual switches are respectively connected to the correspondingly numbered contacts of the corresponding stepping switches, i. e., contact 1 of each stepping switch is connected to contact 1 of the corresponding manual switch and so on. In order not to confuse and complicate the drawing, only one of such connections is shown in Fig. 1.

It is desirable to speed the winding operation once the capacitor section has begun to be wound on the mandrel and there is no longer any danger of tearing the foil or paper due to a sudden start of the winding mandrel.

At this time it should be noted that the positive side P of the main line feeds through leads 31, 32, 33, 46, 56, 57 and 58 and branches off through leads 59, 62 and 63 into the contact arms K of stepping switch A. As there are ten contacts and a neutral contact on each section of stepping switch A, when the commutator has rotated ten times, delivering ten impulses to coil E as above set forth, a circuit will be completed to coil F of stepping switch B, as will now be described.

This circuit is from main P through leads 31, 32, 33, 46, 56, 57, 58 and 62, contact arm K of stepping switch A (foil perforator) which has now advanced to contact 10 of this section of the stepping switch, lead 66, normally closed contact B of relay R–5, lead 67 through coil F and lead 69 to main N.

It is thus apparent that at every tenth revolution of the winding mandrel and commutator, an impulse will be delivered to coil F of stepping switch B advancing the contact arms K thereof one step. Stepping switch B is similar to stepping switch A which has been previously described. It can be seen that stepping switch A counts units while stepping switch B counts tens.

Assuming that it is desired to accelerate the armature after fifteen turns have been wound on the mandrel, manual switch A (accelerator) would be set for five and manual switch B (accelerator) would be set for one.

After the first five revolutions of the winding mandrel and commutator, a circuit would be completed from main P through leads 31, 32, 33, 46, 56, 57, 58 and 59, stepping switch A (accelerator) now rotated to position five, lead 60, manual switch A (accelerator) which had previously been set to position five, lead 61 into stepping switch B (accelerator).

As coil F of stepping switch B has received no impulse from stepping switch A after five revolutions of the latter, as above described, no circuit will be completed through the accelerator section of stepping switch B. As the contact arm of stepping switch A (foil perforator) rotates to ten an impulse will be delivered to coil F of section B as hereinabove described, causing the contact arms of stepping switch B to advance one step. At this time manual switch B (accelerator) and stepping switch B (accelerator) would be series connected but the circuit in this line will have been broken by the advancement of the contact arm of stepping switch A (accelerator) from five to ten. The circuit will not be completed until the contact arm of stepping switch A (accelerator) advances five more steps to position five which it does after fifteen revolutions of the commutator and winding mandrel. At this time a circuit will be completed from main P through leads 31, 32, 33, 46, 56, 57, 58 and 59, stepping switch A (accelerator), lead 60, manual switch A (accelerator), lead 61, stepping switch B (accelerator), lead 70, manual switch B (accelerator), lead 71, through the coil of relay R–6, leads 72, 73 and 69 to main N.

Energization of the coil of relay R–6 will cause the normally open contacts A and B thereof to close. Closing of contact B will shunt out the start portion of the armature resistance and thereby speed the motor as the circuit will be through leads 39 and 40, normally closed contact A of relay R–2, lead 41, closed contact B of relay R–6 and lead 42.

As the circuit completed through the accelerator stepping switches is only momentary, it is necessary to provide a holding circuit that will keep relay R–6 energized and contacts A and B thereof closed. This circuit is completed by the initial closing of contact A of relay R–6 which completes a circuit from main P through leads 31, 32, 33, 46, 56, 74, 75, 76 and 77 closed contact A of relay R–6, the coil of relay R–6, leads 72, 73 and 69 to main N. Thus, even though the accelerator stepping switch sections have broken the circuit, relay R–6 will remain energized as a result of the circuit just described and the entire armature resistance will continue to be shunted out of the circuit.

The winding operation is now proceeding at full speed. After the desired number of turns have been wound on the mandrel, the foil is perforated preparatory to tearing. However, it is desirable to slow down the motor to half speed prior to perforation to prevent overrunning of the paper and foil and improper perforation of the latter. This is done as follows:

After a certain number of turns have been wound on the mandrel, for example 75, it is desired to decelerate. Manual switch A (decelerator) is set to five and manual switch B (decelerator) is set to seven.

As has been heretofore explained, each tenth turn of stepping switch A will send an impulse to stepping switch B and advance the contact arms K thereof one step. After seventy-five turns of the mandrel and commutator, the contact arms of stepping switch B will have advanced to position seven and the contact arms of stepping switch A will have advanced to position five. A circuit will now be completed from main P through leads 31, 32, 33, 46, 56, 57, 58 and 63, stepping switch A (decelerator), lead 80, manual switch A (decelerator), lead 81, stepping switch B (decelerator), lead 82, manual switch B (decelerator), lead 83 through the coil of relay R–2 and leads 84, 72, 73 and 69 to main N.

Relay R–2 will thus be energized, thereby opening normally closed contact A thereof and closing normally open contact B. Opening of contact A breaks the shunt around the stop portion of the armature resistance and places it in the motor circuit, thereby slowing the motor.

A holding circuit for relay R–2 is completed from main P through leads 31, 32, 33, 46, 56, 74, 75, 85, closed contact B of relay R–2 through the coil of relay R–2 and leads 84, 72, 73 and 69 to main N.

If it is desired to perforate the foil after eighty-five turns have been wound on the mandrel, manual switch A (foil perforator) is set for five and manual switch B (foil perforator) is set for eight. After eighty-five turns of the mandrel and commutator, a circuit will be completed from main P, through leads 31, 32, 33, 46, 56, 57, 58 and 62, stepping switch A (foil perforator), lead 79, manual switch A (foil perforator), lead 86, stepping switch B (foil perforator), lead 87, manual switch B (foil perforator), lead 88, through the coil of relay R-7, leads 73 and 69 to main N. This will energize relay R-7 and close normally open contact A thereof.

The closing of contact A of relay R-7 will complete a circuit from main P, through leads 31, 32, 33, 46, 56, 74, 75, 76, closed contact A of relay R-7, leads 92, 93 and 94 through the coil of relay R-4, lead 95 to main N. Energization of relay R-4 will open the normally closed contact A thereof and break the circuit from the commutator to stepping switch A.

At the same time, the completion of the circuit through the foil perforator switches will complete a circuit from main P to lead 88 as heretofore described, lead 96 to the foil perforator solenoid 97, lead 98 to main N. This will actuate the foil perforator mechanism 97' and perforate the foil at the 85th turn.

In addition a circuit will be completed from main P through leads 31, 32, 33, 46, 56, 74, 75 and 76, closed contact A of relay R-7, leads 92 and 99 through the coil of relay R-5 and lead 98 to main N, thereby energizing relay R-5 at the same time that the foil is perforated and the impulses from the commutator cut off from the stepping switches by the energization of relay R-4.

Energization of relay R-5 will affect contacts A, B, C, D, E and F thereof in the following manner:

1. Normally open contact A will close, completing a circuit from main P through leads 31, 32, 33, 46, 56, 74 and 100, closed contact A of relay R-5, lead 101, normally closed contact A of relay R-8, lead 102, contact X of coil F of stepping switch B through coil F and lead 69 to main N. Contact X is part of a "make and break" switch similar to a buzzer or vibrator and will vibrate when coil F is energized, making and breaking the circuit through coil F and thereby causing the contact arms of stepping switch B to advance very rapidly to the neutral or "home" position.

2. Normally closed contact B will open, breaking the circuit to coil F of stepping switch B. Ordinarily when the contact arm K of stepping switch A (foil perforator) comes to position 10, a circuit is completed from main P through leads 31, 32, 33, 46, 56, 57, 58 and 62, stepping switch A (foil perforator), lead 66, normally closed contact B of relay R-5, lead 67, coil F and lead 69 to main N. This circuit causes stepping switch B to advance one step at each tenth revolution of the commutator. Such action is not wanted at this time, as stepping switch B is now advancing to the "home" position due to closing of contact A of relay R-5. Opening of normally closed contact B of relay R-5 prevents this movement.

3. Normally open contact C closes, completing a circuit from main P through leads 31, 32, 33, 46, 56, 74 and 103, closed contact C, lead 104, normally closed contact A of relay R-9, lead 105, contact Y of coil E of stepping switch A, through coil E and lead 59' to main N.

The operation of contact Y is similar to that of contact X described above and the contact arms K of stepping switch A will advance very rapidly to the neutral or "home" position.

4. Normally open contact D will close to complete a circuit from brush B-2 of the commutator to coil G of stepping switch C. The circuit is as follows: From main P through leads 31, 32, 33, 46, 47 and 56, brush B-1, the segment brush B-2, lead 107, closed contact D of relay R-5, lead 106, normally closed contact A of relay R-10, lead 108, coil G of stepping switch C, leads 110, 90, 73 and 69 to main N.

As there are five segments on the segmental ring 27' of the commutator, each revolution thereof will send five impulses through coil G of stepping switch C. It should be noted that these rapid impulses do not occur until after the foil has been perforated.

5. Normally open contact E will close to complete the circuit from main P through leads 31, 32, 33, 46, 56, 74 and 111, closed contact E, lead 112 to the contact arm K of stepping switch B (foil perforator), thereby connecting this arm to the positive main P for the reason hereinafter set forth.

6. Contact F will close to hold contact A of relay R-4 open by completing the circuit from main P through leads 31, 32, 33, 46, 56, 74 and 113, closed contact F, lead 94, through the coil of relay R-4 and lead 95 to main N. Relay R-5 is also kept energized by the closing of contact F thereof by the completion of a circuit from main P through leads 31, 32, 33, 46, 56, 74 and 113, closed contact F, leads 93 and 99 through the coil of relay R-5 and lead 98 to main N.

It is now necessary to stop the homing action of stepping switches B when they reach neutral or "home" position.

When the contact arm K of stepping switch A (foil perforator) gets to neutral position, there will be a completed circuit from main P, leads 31, 32, 33, 46, 56, 57, 58 and 62, contact arm K of stepping switch A (foil perforator), lead 114 through the coil of relay R-9 and leads 115, 73 and 69 to main N. As relay R-9 is now energized, normally closed contact A thereof will open, breaking the circuit to contact Y of stepping switch A and stopping the homing action when all the contact arms of stepping switch A are at neutral position.

The closing of contact E of relay R-5 connected the contact arm K of stepping switch B (foil perforator) to positive main P. When the contact arm of stepping switch B (foil perforator) gets to neutral position, there will be a circuit completed from main P through leads 31, 32, 33, 46, 56, 74 and 111, closed contact E, lead 112, stepping switch B (foil perforator), lead 116 through the coil of relay R-8, leads 115, 73 and 69 to main N. Energization of relay R-8 will open normally closed contact A thereof and the circuit to contact X of stepping switch B will be broken, thereby stopping the homing action when the contact arms of stepping switch B are at neutral position.

The next operation in the sequence of operations to occur is the gripping of the foil by the foil gripper mechanism 125' which will cause the foil to tear at the place of perforation. This gripping is only momentary but sufficient to cause tension to be exerted on the foil, thereby causing it to tear. Manual switch C (foil grippers) and D (foil grippers) are set for the proper number of turns after the foil has been perforated so that the perforated portion of the foil will be between the paper cutters 148' and the feed rollers 53' (which are in open position, having been opened as heretofore set forth). Stepping switch C is not energized until the normally open contact D of relay R-5 is closed as heretofore described. Closing of contact D occurs at the same time that the foil is perforated. Inasmuch as five impulses per revolution of the mandrel and commutator are being transmitted to coil G of stepping switch C, the step by step advancement of this switch occurs rapidly. The action of stepping switches C and D is similar to that of stepping switches A and B, switch C registering units and switch D tens and will not be described in more detail.

The circuit to energize relay R-11 for the foil grippers is as follows:

From main P through leads 31, 32, 33 and 117, stepping switch C (foil gripper), lead 118, manual switch C (foil gripper), lead 119 to manual switch D (foil gripper), lead 120, stepping switch D (foil gripper), lead 121, normally closed contact A of relay R-11 through the coil of relay R-12 and lead 122, to main N. Energization of relay R-12 will close the normally open contact A thereof, completing a circuit from main P through leads 31 and 123, closed contact A of relay R-12, lead 124, through foil gripper solenoid 125 to main N. This will close the foil grippers so that the foil is torn at the point of perforation.

As there is no holding circuit on the foil gripper relay R-12, as soon as the stepping switches C and D have advanced, the circuit to the coil of relay R-12 will immediately open and the circuit to the foil gripper solenoid coil 125 will be broken, thereby releasing the foil gripper mechanism.

It is important that once the foil grippers close and open, they do not repeat this operation until the next section is wound. For this reason a normally open switch S-4 is provided, which is mechanically operated by the closing of the foil grippers. Closing of switch S-4 will complete a circuit from main P through leads 31, 32, 33, 117, switch S-4, lead 127 through the coil of relay R-11 and lead 122 to main N. Energization of relay R-11 will close normally open contact B thereof and open normally closed contact A thereof, breaking the circuit to relay R-12, thereby opening contact A thereof and breaking the circuit to solenoid 125. In order that contact A of relay R-11 remains open after switch S-4 reopens a holding circuit for relay R-11 is provided as follows: From main P through leads 31, 123, closed contact B of relay R-11, lead 127 through the coil of relay R-11 and lead 122 to main N.

The next step in the sequence of operations is the closing of the paper feed rollers 53'. These rollers are normally in an open position during the winding of each new section in order to prevent drag on the paper and foil during the winding operation since the peripheral speed of the paper past the feed rollers varies with the diameter of the section as it is being wound. If the feed rollers are driven at a peripheral speed greater than the speed of the paper, the section will be loosely wound and there will be a loop between the feed roller and the paper; if a lesser speed, there will be a drag on the paper resulting in tearing of the same.

In the open position of the feed rollers, switch S-3 is open as heretofore explained and shown in Fig. 4. The coil of relay R-3 is not energized and contact A thereof is open as is the circuit to the feed roller opening solenoid 48. However, the feed rollers remain open as heretofore explained.

The feed rollers must be closed after the foil has been perforated and the foil grippers closed and kept closed until the mandrel begins to turn to wind a new section, as it is necessary to maintain positive tension on the paper and foil and to feed a predetermined length thereof after they have been cut, to the winding mandrel for the next section.

Manual switch C (feed roller) and D (feed roller) are set so that they will operate slightly after the foil gripper 125'. A circuit is completed from main P through leads 31, 32, 117 and 130, stepping switch C (feed roller), lead 131, manual switch C (feed roller), lead 132, manual switch D (feed roller), lead 133, stepping switch D (feed roller), lead 134 through the coil of relay R-13 and lead 135 to main N. This energizes relay R-13 and closes normally open contacts A and B thereof. Contact B of relay R-13 closes to hold relay R-13, the circuit being from main P through leads 31, 32, 33, 117 and 136, closed contact B, through the coil of relay R-13 and lead 135 to main N.

Closing of contact A of relay R-13 energizes feed roller closing solenoid 53, the circuit being from leads 31, 32, 33, 117 and 138, closed contact A of relay R-13, feed roller closing solenoid 53 and lead 140 to main N.

When solenoid 53 is energized, as shown in Fig. 4, armature 141 thereof is pulled to the right, moving rod 52 connected thereto and switching the air valve 50 so that the feed rollers 53' close. Movement of rod 52 will cause contact 51 to move away from switch S-3 closing the latter and completing the circuit to feed roller opening solenoid 48 and energizing the latter. However, though both solenoids 48 and 53 are now energized and pulling in opposite direction, since solenoid 53 was energized first, it exerts the greater pull and keeps the feed rollers closed. Since the entire circuit is cut off a few turns hence, there will be no appreciable heating of the solenoids.

The next step in the sequence of operations is the cutting of the paper. Manual switch C (paper cutter) and D (paper cutter) are set for the predetermined number of turns. A circuit is completed from main P through leads 31, 32, 33, 117, 130 and 142, stepping switch A (paper cutter), lead 143, manual switch C (paper cutter), lead 144, stepping switch D (paper cutter), lead 145, manual switch D (paper cutter), lead 146 through the coil of relay R-14 to main N.

Energization of relay R-14 will close the normally open contact A thereof and momentarily complete a circuit from main P through leads 31, 32, 33 and 117, closed contact A of relay R-14, lead 147, paper cutter solenoid 148 to main N, thereby cutting the paper.

The next operation is the resetting of the circuits to start position.

Manual switch C (reset) and D (reset) are set to close restoring circuits a proper number of turns after the cutting operation has been performed.

There will be a circuit completed from main P through leads 31, 32, 33, 117 and 149, stepping switch C (reset), lead 150, manual switch C (reset), lead 151 to stepping switch D (reset), lead 152, manual switch D (reset), lead 153 through the coil of relay R-15, lead 154 to main N, thereby energizing relay R-15.

As has been previously set forth, at the same time as switch S-1 closed, switch S-1' closed, completing a circuit from main P through leads 31 and 156, through the coil of relay R-16 and lead 157 to main N. Energization of relay R-16 closed normally open contact A thereof, completing a circuit from main P through leads 37 and 158 closed contact A of relay R-16, lead 159 to the contacts of relay R-15.

Energization of relay R-15 will affect contacts A, B, C, D, E and F thereof in the following manner:

1. Normally open contact A of relay R-15 closes, completing a circuit from main P through leads 37, 158, closed contact A, relay R-16, lead 159, closed contact A, relay R-15, lead 160, normally closed contact A of relay R-17, lead 161, contact Z through coil H of stepping switch D, lead 162 to main N. The "make and break" operation of contact Z which is similar to contacts X and Y of stepping switches B and A has been previously described and will quickly home the contact arms of stepping switch D to neutral position.

2. Normally closed contact B opens and breaks the circuit from stepping switch C (reset) point 10 to contact Z of coil H. As has been heretofore explained with respect to stepping switches A and B at every complete revolution of stepping switch C, an impulse is sent to the coil of stepping switch D. Since the contact arm of stepping switch C (reset) is connected to positive main P by reason of the circuit from main P through leads 31, 32, 33, 117 and 149 to the contact arm K, it is important that no impulse be transmitted to coil H while the resetting operation is on. Consequently the opening of normally closed contact B breaks the circuit from the contact Z through lead 163, contact B, lead 164 to point 10 of stepping switch C (reset).

3. Normally open contact C closed, completing a circuit from main P through leads 37, 158, closed contact A of relay R-16, lead 159, contact C, lead 165 through the coil of relay R-10, lead 166 to main N, thereby energizing relay R-10, opening normally closed contact A thereof and breaking the circuit from brush B-2, lead 107, closed contact D of relay R-5, lead 106, normally closed contact A of relay R-10, lead 108 through coil G of stepping switch C, leads 110, 90, 73 and 69 to main N. This will stop the movement of stepping switch C caused by the rotation of the commutator.

Closing of contact C of relay R-15 also holds relay R-15, the circuit being from main P through leads 37, 158, closed contact A of relay R-16, lead 159, contact C, leads 165 and 167 through the coil of relay R-15 and lead 154 to main N.

4. Normally open contact D when closed connects the contact arm K of stepping switch D (reset) to positive main P. The circuit is from main P through leads 37, 158, closed contact A of relay R-16, lead 159, closed contact D, lead 168 and the contact arm of stepping switch D (reset). When the positive contact arm of stepping switch D (reset) reaches neutral position, there is a circuit from this positive contact arm through lead 169 and the coil of relay R-17 and lead 170 to main N. Energization of relay R-17 opens normally closed contact A thereof and stops the "homing" action of stepping switch D.

5. Normally open contact E of relay R-15 closes to complete a circuit through relay R-18 as follows: Main P through leads 37, 158, closed contact A of relay R-16, lead 159, closed contact E, lead 171 through the coil of relay R-18, lead 172 to main N. This energizes relay R-18 and closes normally open contact A thereof which completes a circuit from main P through leads 31, 32, 33, 173, positive stop latch solenoid 30, closed contact A of relay R-18 and lead 36 to main N.

Energization of the positive stop latch solenoid coil 30, as shown in Fig. 3, causes stop lever 29 to be pivoted, thereby releasing lever 23 which is pulled under the tension of spring 27 against rotating hub 25, the end 28 of said lever entering the slot 24 in the hub when the two are aligned. There will be a slight overrunning of the mandrel 26 due to the fact that lever 23 is pivoted as at 21'. The slight overrunning will cause lever 23 to press against switch S-2 and open this switch. As lever 23 pivoted toward the hub, it released switches S-1 and S-1', permitting them to open. It is to be noted that the positive stop ensures that the mandrel will be in the same position at the end of the winding of each capacitor section.

Opening of normally closed switch S-2 will break the holding circuit on relay R-1, opening contacts A, B and C thereof and breaking the circuit to the motor.

6. Normally open contact F when closed starts "homing" of stepping switch C, the circuit being from main P through leads 37, 158, closed contact A of relay R-16, lead 159, closed contact F, lead 175, normally closed contact A of relay R-19 through contact W of stepping switch C which has a "make and break" movement, through coil G, leads 110, 90, 73 and 69 to main N, thereby "homing" stepping switch C.

When stepping switch C (reset) gets to neutral position, it completes a circuit from main P through leads 31, 32, 33, 117 and 149, stepping switch C (reset) through the neutral contact, lead 176 through the coil of relay R-19, lead 177 to main N. Energization of relay R-19 opens normally closed contact A thereof and breaks the homing circuit.

It is to be noted that even though the motor circuit is opened as a result of the opening of switch S-2, and switches S-1 and S-1' are opened, the circuit to the contacts of relay R-15 remains closed in order that the resetting action may be completed.

This is the result of the condenser C across the coil of relay R-16 and the resistance R in series with the coil. When the coil was initially energized, condenser C was charged. When switch S-1' is opened, condenser C discharges slowly through the coil of relay R-16, thereby keeping the latter energized for a short period of time so that the resetting operation may be completed.

The control system is now ready for the next section to be wound.

It is apparent that once the proper settings are made, any number of sections may be wound. If it is desired at any time to change the number of turns on the sections, it is only a question of resetting the manual switches, this operation being very simple and taking only a few seconds.

As many changes could be made in the above construction and system and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. An electrical control system comprising an electric motor, means to start said motor, a first set of automatically rotatable switches, a second set of automatically rotatable switches, electromagnetic means associated with each of said sets of switches intermittently to rotate the latter, means driven by said motor for automatically delivering periodic impulses to said electromagnetic means to energize the latter, said means comprising a commutator driven by said motor, said commutator comprising a continuous conducting ring and a segmental conducting ring insulated from said continuous conducting ring and comprising a plurality of conducting segments each insulated from the other, one of said segments being connected to said continuous ring, a brush normally engaging said continuous conducting ring and connected to said electromagnetic means associated with said first set of switches, a pair of brushes adapted simultaneously to engage successive segments of said segmental ring, one of said brushes being connected to a source of current and the other of said brushes being connected to said electromagnetic means associated with said second set of switches whereby upon each complete revolution of said commutator, and engagement by the brush of said pair of brushes connected to said source of current with said segment connected to said continuous conducting ring, a circuit will be completed through said brush engaging said continuous conducting ring to said electromagnetic means associated with said first set of switches and upon each engagement of each of said segments of said segmental conducting ring with said pair of brushes, a circuit will be completed through said brushes to said electromagnetic means associated with said second set of switches.

2. An electric control system for predetermining the sequence of a plurality of timed mechanical operations, said system comprising an electric motor, means to start said motor at reduced speed, a plurality of stepping switches each having a home position, means controlled by the rotation of said motor to deliver successive electric impulses to said stepping switches, means controlled by said stepping switches to accelerate said motor, means controlled by said stepping switches to decelerate said motor, and actuated at an advanced part of the cycle of operation, an initial timed mechanical action under control of said stepping switches subsequent to said time of deceleration, means to deliver impulses at a rapid rate to said stepping switches to restore the latter to home position after said initial mechanical action, a relay under control of said stepping switches actuated at the time of said initial mechanical action, said relay having a plurality of switches including a switch controlling the means to deliver impulses to home said stepping switches, and means after said stepping switches have reached said home position, to stop said homing impulses.

3. An electrical control system for predetermining the sequence of a plurality of timed mechanical operations, said system comprising an electric motor, means to start said motor at reduced speed, an initial set of stepping switches, a final set of stepping switches, said stepping switches each having a home position, means controlled by the rotation of said motor to deliver successive electric impulses to said stepping switches, a normally open switch in circuit with said final set of stepping switches, means controlled by said initial set of stepping switches to accelerate said motor, means controlled by said initial set of stepping switches to decelerate said motor at an advanced part of the cycle of operation, an initial timed mechanical action under control of said initial set of stepping switches subsequent to said time of deceleration, means to deliver impulses at a rapid rate to said initial set of stepping switches to restore the latter to home position after said initial mechanical action, a sequence of timed mechanical actions under control of said final set of stepping switches, a relay under control of said initial set of stepping switches actuated at the time of said initial mechanical action, said relay controlling a plurality of switches including a switch controlling the means to deliver impulses at a rapid rate to said initial set of stepping switches to restore the latter to home position after said initial mechanical action, and said normally open switch in series with said final set of stepping switches, whereby on closing of said normally open switch, said final set of stepping switches will be actuated to determine the sequence of timed mechanical operations following the initial timed mechanical operation, and means to deliver impulses at a rapid rate to said final set of stepping switches to restore the latter to home position.

4. The combination set forth in claim 3 in which a relay is provided under control of said final set of stepping switches actuated at the time of the last timed mechanical operation following the initial timed mechanical operation, said relay controlling a plurality of switches including a switch controlling the means to deliver impulses at a rapid rate to said final set of stepping switches to restore the latter to home position, and means after said final set of stepping switches have reached home position, to stop said homing impulses.

5. An electric control system for predetermining the sequence of a plurality of timed mechanical operations, said system comprising an electric motor, means to start said motor, a plurality of stepping switches each having a home position, means controlled by the rotation of said motor to deliver successive electric impulses to said stepping switches, an initial timed mechanical action under control of said stepping switches, means to deliver impulses at a rapid rate to said stepping switches to restore the latter to home position after said initial mechanical action, a relay under control of said stepping switches actuated at the time of said initial mechanical action, said relay having a plurality of switches including a switch controlling the means to deliver impulses to home said stepping switches, and means after said stepping switches have reached said home position to stop said homing impulses.

6. An electrical control system for predetermining the sequence of a plurality of timed mechanical operations, said system comprising an electric motor, means to start said motor, an initial set of stepping switches, a final set of stepping switches, said stepping switches each having a home position, means controlled by the rotation of said motor to deliver successive electric impulses to said stepping switches, a normally open switch in circuit with said final set of stepping switches, an initial timed mechanical action under control of said initial set of stepping switches, means to deliver impulses at a rapid rate to said initial set of stepping switches to restore the latter to home position after said initial mechanical action, a sequence of timed mechanical actions under control of said final set of stepping switches, a relay under control of said initial set of stepping switches actuated at the time of said initial mechanical action, said relay controlling a plurality of switches including a switch controlling the means to deliver impulses at a rapid rate to said initial set of stepping switches to restore the latter to home position after said initial mechanical action, and said normally open switch in series with said final set of stepping switches, whereby on closing of said normally open switch, said final set of stepping switches will be actuated to determine the sequence of timed mechanical operations following the initial timed mechanical operation, and means to deliver impulses at a rapid rate to said final set of stepping switches to restore the latter to home position.

LOUIS KAHN.

REFERENCES CITED

The following references are of record in the file of this patent:

UNITED STATES PATENTS

| Number | Name | Date |
|---|---|---|
| 2,049,634 | Troutman | Aug. 4, 1936 |
| 2,146,848 | Purdy et al. | Feb. 14, 1939 |
| 2,255,498 | Babillis | Sept. 9, 1941 |
| 2,346,869 | Poole | Apr. 18, 1944 |
| 2,416,652 | Stevens | Feb. 25, 1947 |
| 2,444,209 | Pond | June 29, 1948 |
| 2,468,609 | Whitehouse | Apr. 26, 1949 |